US012609262B2

(12) United States Patent
Yoon et al.

(10) Patent No.: US 12,609,262 B2
(45) Date of Patent: Apr. 21, 2026

(54) FIELD EMISSION X-RAY SOURCE DEVICE

(71) Applicants: VATECH Co., Ltd., Gyeonggi-do (KR); VATECH EWOO Holdings Co., Ltd., Gyeonggi-do (KR)

(72) Inventors: Duckhwan Yoon, Gyeonggi-do (KR); Sora Sim, Gyeonggi-do (KR)

(73) Assignees: VATECH Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 238 days.

(21) Appl. No.: 18/396,032

(22) Filed: Dec. 26, 2023

(65) Prior Publication Data

US 2025/0191871 A1 Jun. 12, 2025

(30) Foreign Application Priority Data

Dec. 7, 2023 (KR) ........................ 10-2023-0176968

(51) Int. Cl.
*H01J 35/06* (2006.01)
*H01J 35/04* (2006.01)

(52) U.S. Cl.
CPC .......... *H01J 35/065* (2013.01); *H01J 35/045* (2013.01); *H01J 35/066* (2019.05); *H01J 2235/062* (2013.01)

(58) Field of Classification Search
CPC ...... H01J 35/045; H01J 35/065; H01J 35/066; H01J 35/08; H01J 35/16
See application file for complete search history.

(56) References Cited

U.S. PATENT DOCUMENTS

2016/0148776 A1* 5/2016 Jeong .................... H01J 35/065
315/337
2020/0144016 A1* 5/2020 Kim .......................... H01J 5/32

FOREIGN PATENT DOCUMENTS

| | | | |
|---|---|---|---|
| CN | 101521135 | A | 9/2009 |
| KR | 10-2020-0014990 | A | 2/2020 |
| KR | 10-2095268 | B1 | 3/2020 |
| KR | 10-2022-0120848 | A | 8/2022 |
| KR | 10-2023-0064960 | A | 5/2023 |

OTHER PUBLICATIONS

European Patent Office, Extended European Search Report of corresponding EP Patent Application No. 23219799.6, Jun. 24, 2024.

* cited by examiner

*Primary Examiner* — David J Makiya
*Assistant Examiner* — Miya Downing
(74) *Attorney, Agent, or Firm* — IP Legal Services, LLC

(57) ABSTRACT

Proposed is a field emission X-ray source device including an insulating housing, an anode electrode, a cathode electrode, a gate electrode, an electronic emitter, and a target. The insulating housing extends in a tube shape. The anode electrode covers a first side of the insulating housing. The cathode electrode is placed at a second side of the insulating housing and faces the anode electrode. The gate electrode covers the second side of the insulating housing, and has an opening formed in the direction of the second side. The electronic emitter is provided on the cathode electrode and is configured to emit an electron beam toward the anode electrode. The target is provided on the anode electrode and is placed to face the electronic emitter, and enables X-rays to be generated by collision with the electron beam.

8 Claims, 5 Drawing Sheets

FIELD EMISSION X-RAY SOURCE DEVICE

CROSS REFERENCE TO RELATED APPLICATION

The present application claims priority to Korean Patent Application No. 10-2023-0176968, filed Dec. 7, 2023, the entire contents of which is incorporated herein for all purposes by this reference.

BACKGROUND OF THE INVENTION

Field of the Invention

The present disclosure relates to a field emission X-ray source device. More particularly, the present disclosure relates to a field emission X-ray source device in which electrons emitted from an electronic emitter on the cathode electrode side are in collision with a target on the anode electrode side to emit X-rays.

Description of the Related Art

A conventional X-ray source device uses a thermionic cathode made of tungsten material as an electronic emitter for generating X-rays, and has a structure in which a tungsten filament is heated with a high voltage to emit electrons and the emitted electrons collide with a target on the anode electrode side to generate X-rays.

However, the tungsten filament-based thermionic cathode X-ray source device consumes a lot of power in generating electrons due to significant heat loss, and the efficiency of X-ray emission is extremely low because the generated electrons are randomly emitted from the tungsten surface having a spiral structure. In addition, specific time intervals are required for heating and cooling the tungsten filament, and it is difficult to emit X-rays in the form of pulses, resulting in limitations in use.

To solve the problems of the conventional thermionic cathode X-ray source device, research on a field emission X-ray source device using a nano structure, such as a carbon nanotube (CNT), as a cold cathode electronic emitter has been widely conducted in recent years. Unlike the conventional tungsten filament-based thermionic cathode X-ray source device, the field emission X-ray source device uses an electric field emission method as an electron emission mechanism. The field emission X-ray source device has a lower power consumption than the tungsten filament-based thermionic cathode X-ray source device, and the emitted electrons are emitted along the longitudinal direction of a nanostructure, such as a carbon nanotube, so the directionality of electrons toward the target on the anode electrode side is excellent and the efficiency of X-ray emission is very high. In addition, it is easy to emit X-rays in the form of pulses through field control.

A conventional field emission X-ray source device 9 shown in FIG. 1 may include a housing 91 made of an insulating material, an anode electrode 92 covering a first side of the housing 91, a cathode electrode 93 covering a second side of the housing, and a gate electrode 94 placed on one side of the cathode electrode and spaced away from the cathode electrode by a particular distance.

A conventional field emission X-ray source includes, inside an insulating housing, an electronic emitter provided on a cathode electrode and a gate electrode provided nearby, and is configured to enable electrons to be emitted from the electronic emitter by an electric field formed between the gate electrode and the cathode electrode. The gate electrode has the form of a mesh or the form of a metal plate in which multiple holes are arranged according to the arrangement of the electronic emitter. When an electron beam emitted from the electronic emitter travels passing through the mesh structure or the multiple holes, electrons are accelerated by a potential difference of several tens to hundreds kV formed between the anode electrode and the cathode electrode and the accelerated electrons are in collision with an X-ray target provided on the anode electrode side to emit X-rays. In the meantime, at least one focusing electrode may be added between the anode electrode 92 and the gate electrode 94 so that an electron beam is focused onto a region of the anode electrode. To operate the field emission X-ray source device, a positive gate voltage different from the potential of the cathode electrode by several tens kV is applied to the gate electrode, and a positive acceleration voltage different from the potential of the cathode electrode by several tens to hundreds kV is applied to the anode electrode. Herein, a voltage for focusing an electron beam is applied to the focusing electrode, and the voltage applied to the focusing electrode may vary depending on operating conditions.

In the field emission X-ray source device having this structure, insulation is important due to the high potential difference applied to the anode electrode 92, the cathode electrode 93, and the gate electrode 94. A particular insulating distance is secured in the field emission X-ray source device. However, the gate electrode 94 formed of a conductive material is vulnerable to a high voltage, so there is a risk of insulation breakdown. Near the target provided at the anode electrode, a high voltage may damage the insulating housing or reduce durability. In addition, the gate electrode 94 between the anode electrode 92 and the cathode electrode 93 is exposed, there is a risk of decreasing insulation performance.

Accordingly, there is a demand for a field emission X-ray source device that has a longer insulating distance between the gate electrode and the anode electrode than the conventional field emission X-ray source device, and that is easy to manufacture and minimizes the exposure of the cathode electrode.

The technology behind the present disclosure is disclosed in Korean Patent No. 10-2095268.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a field emission X-ray source device in which an insulating distance between a gate electrode and an anode electrode is longer than that in a conventional field emission X-ray source device.

In addition, the present disclosure is directed to providing a field emission X-ray source device of which a cathode electrode and a gate electrode are manufactured in modules for easy manufacture.

In addition, the present disclosure is directed to providing a field emission X-ray source device that minimizes the exposure of a cathode electrode to the outside of an insulating housing.

However, technical objectives that the embodiment of the present disclosure is intended to achieve are not limited to the above-described technical objectives, and there may be other technical objectives.

According to an embodiment of the present disclosure, there is provided a field emission X-ray source device including: an insulating housing in a tube shape; an anode electrode covering a first side of the insulating housing; a gate electrode covering a second side of the insulating housing; a cathode electrode placed at the second side, inside the insulating housing; an electronic emitter provided on the cathode electrode, and configured to emit an electron beam toward the anode electrode; and a target provided on the anode electrode and facing the electronic emitter, and configured to enable X-rays to be generated by collision with the electron beam.

In addition, according to the embodiment of the present disclosure, the gate electrode may include: a first gate covering the second side of the insulating housing; a second gate in a cylindrical shape rested on the first gate, inside the insulating housing; and a gate mesh provided at the second gate.

In addition, according to the embodiment of the present disclosure, the field emission X-ray source device may further include a cylindrical insulating spacer rested on the first gate, inside the second gate, wherein the cathode electrode may be rested on the insulating spacer inside the second gate and the electronic emitter and the gate mesh may face each other.

In addition, according to the embodiment of the present disclosure, the field emission X-ray source device may further include an opening formed in the first gate inside the second gate to expose the cathode electrode to outside.

In addition, according to the embodiment of the present disclosure, the second gate may include a gate flange extending toward the first side beyond the gate mesh.

In addition, according to the embodiment of the present disclosure, the gate electrode, the cathode electrode, and the insulating spacer may be manufactured in modules and combined with the insulating housing.

In addition, according to the embodiment of the present disclosure, the anode electrode may include an anode hood surrounding the target and extending toward the second side beyond the target.

In addition, according to the embodiment of the present disclosure, the field emission X-ray source device may further include a window provided at the anode hood to transmit the X-rays generated from the target.

The above-mentioned solutions are merely exemplary and should not be construed as limiting the present disclosure. In addition to the above-described exemplary embodiment, additional embodiments may exist in the drawings and detailed description of the disclosure.

According to the above-mentioned solutions of the present disclosure, the present disclosure can provide the field emission X-ray source device in which the insulating distance between the gate electrode and the anode electrode is longer than that in a conventional field emission X-ray source device.

In addition, the present disclosure can provide the field emission X-ray source device of which the cathode electrode and the gate electrode are manufactured in modules for easy manufacture.

In addition, the present disclosure can minimize the exposure of the cathode electrode to the outside of the insulating housing.

However, effects achieved by the embodiment of the present disclosure are not limited to the above-described effects, and there may be other effects.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
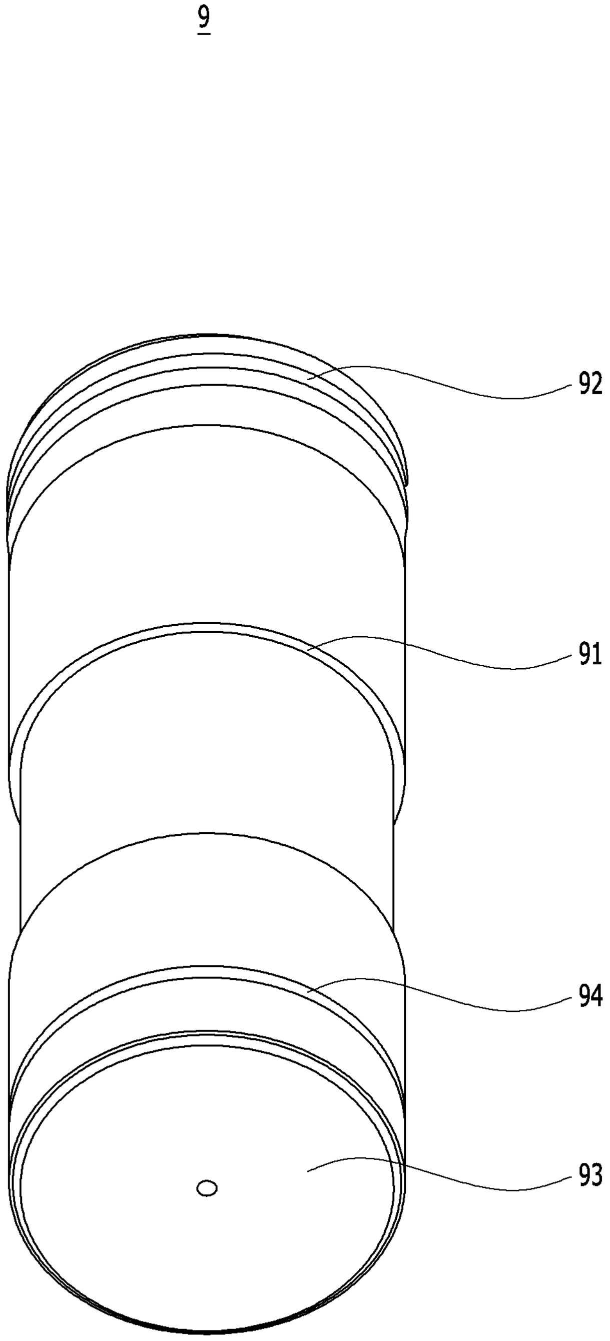
FIG. 1 is a schematic perspective view of a conventional field emission X-ray source device 9.

Hereinbelow, an exemplary embodiment of the present disclosure will be described in detail with reference to the accompanying drawings such that the present disclosure can be easily embodied by those skilled in the art to which this present disclosure belongs. However, the present disclosure may be embodied in various different forms and should not be limited to the embodiment set forth herein. Further, in order to clearly explain the present disclosure, portions that are not related to the present disclosure are omitted in the drawings, and like reference numerals designate like elements throughout the specification.

Throughout the specification of the present disclosure, when a part is referred to as being "connected" to another part, it includes not only being "directly connected", but also being "indirectly connected" with an intervening component therebetween or being "electrically connected" with an intervening device therebetween.

Throughout the specification, when a member is said to be "on", "at an upper portion of", "on top of", "under", "at a lower portion of", "at the bottom of" another member, this includes not only when the two members are in contact, but also when there is an intervening member between the two members.

Throughout the specification, when a part "includes" an element, it is noted that it further includes other elements, but does not exclude other elements, unless specifically stated otherwise.

Terms "first" and "second" may be used to indicate different orders of identical or substantially identical components, and may be construed to mean substantially the same as components not indicated as "first" and "second".

In addition, in the following description of the embodiment of the present disclosure, terms (upper, top, lower, etc.) related to direction or position are defined with respect to the arrangement of individual components shown in the drawings.

In the embodiment of the present disclosure, it can be understood that terms upper or top mean the direction in which an anode electrode 20 is placed (at the 12 o'clock position in FIGS. 2 and 3) relative to an insulating housing 10 and terms lower or bottom mean the direction in which a cathode electrode 60 is placed (at the 6 o'clock position in FIGS. 2 and 3) relative to the insulating housing 10.

Figure 2:
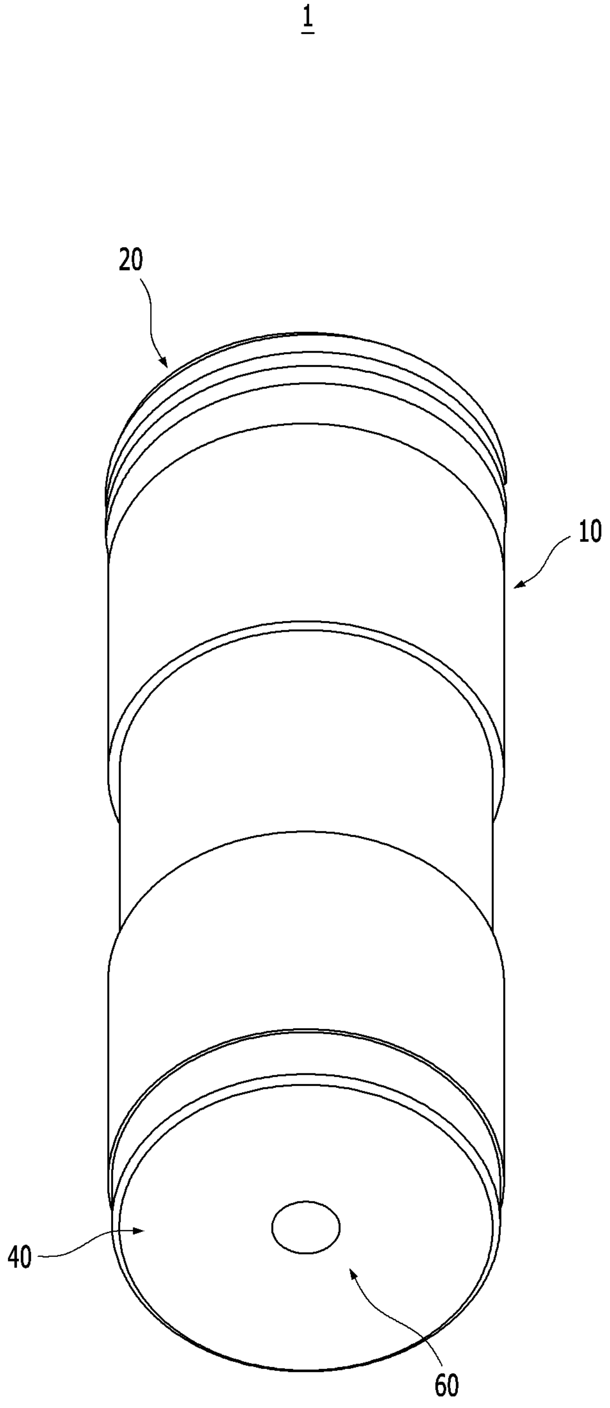
FIG. 2 is a schematic perspective view of a field emission X-ray source device 1 according to an embodiment of the present disclosure.
Figure 3:
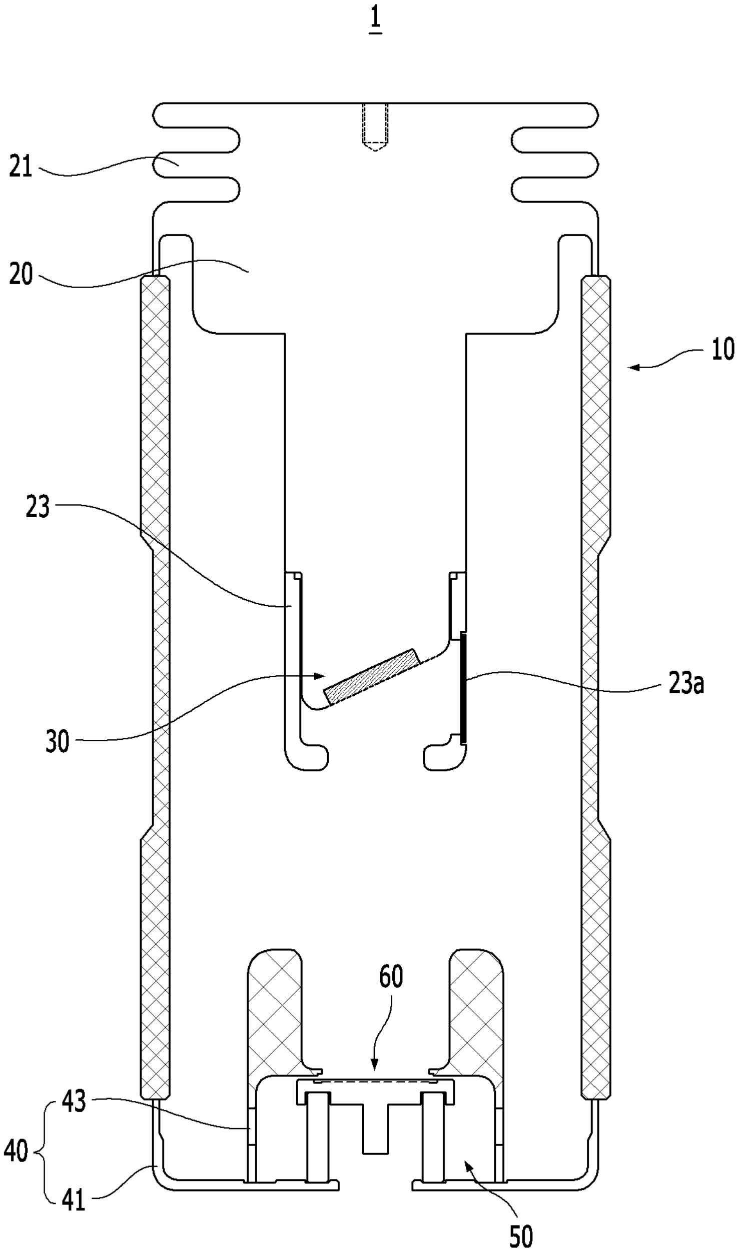
FIG. 3 is a schematic cross-sectional view of the field emission X-ray source device 1 according to the embodiment of the present disclosure.
Figure 4:
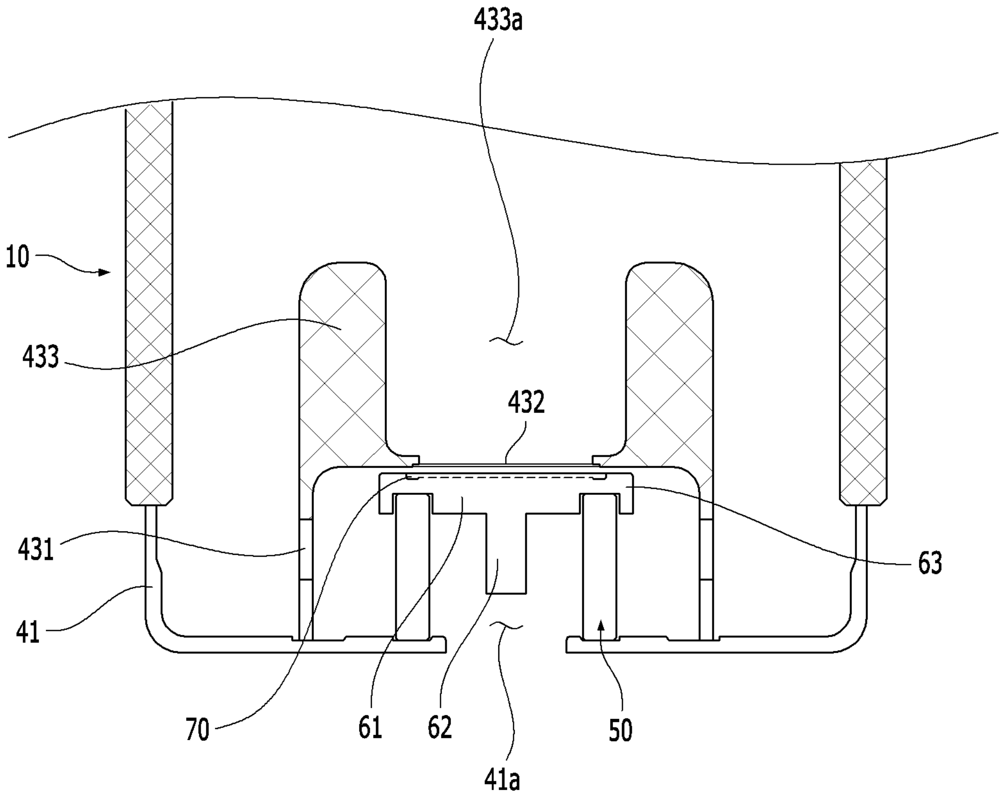
FIG. 4 is a schematic enlarged view of a lower portion of the field emission X-ray source device 1 according to the embodiment of the present disclosure.

Hereinafter, a field emission X-ray source device 1 according to an exemplary embodiment of the present disclosure will be described. Referring to FIGS. 2 to 4, the field emission X-ray source device 1 may include an insulating housing 10, an anode electrode 20, a target 30, a gate electrode 40, an insulating spacer 50, a cathode electrode 60, and an electronic emitter 70.

The insulating housing 10 may be formed of an insulating material, such as ceramic, glass, or silicone, and may be made of materials, such as alumina ceramics, for example. Since the insulating housing 10 is formed of an insulating material, the anode electrode 20 and the cathode electrode 60 of the field emission X-ray source device 1 are electrically isolated from each other. In addition, the inside of the insulating housing 10 may be maintained in a vacuum or a near vacuum.

The insulating housing 10 may extend in a tube shape of which a first side and a second side are covered by the anode electrode 20 and the gate electrode 40, which will be described later. That is, the insulating housing 10 may have a tube shape with a first side and a second side, that is, a first surface and a second surface, opened. As will be described later, the first side may be covered by the anode electrode 20 and the second side may be covered by the gate electrode 40. The insulating housing 10 may be a tube extending as a single object.

In addition, the first side of the insulating housing 10, specifically, the portion allowing X-rays at one side close to the anode electrode 20 to be emitted, may be formed with a smaller thickness than other portions in upper and lower positions, as shown in FIG. 3. Thus, an unnecessary wavelength band may be filtered from the X-ray that penetrates through the portion.

The anode electrode 20 may be placed to cover the first side of the insulating housing. The anode electrode 20 may serve as an acceleration electrode by forming a high potential difference of several tens to hundreds kV in conjunction with the cathode electrode 60 at which the electronic emitter 70, which will be described later, is placed. The anode electrode 20 may also serve as an X-ray target that enables X-rays to be emitted due to the collision with electrons emitted from the electronic emitter 70 and accelerated. The anode electrode 20 may include an anode electrode body covering the insulating housing, and may include a heat dissipation structure 21 outside the insulating housing and an anode hood 23 inside the insulating housing.

The anode electrode body may be formed of various conductive metal materials, for example, oxygen-free copper (OFHC). Regarding the anode electrode body, it can be understood that one among metal materials that can withstand high temperatures which has a higher thermal conductivity than the target 30 is advantageous in terms of heat diffusion and one having a thermal expansion coefficient similar to that of the insulating housing 10 is advantageous in terms of adhesion to the insulating housing 10.

The heat dissipation structure 21 may be provided to increase the surface area of the anode electrode in a portion exposed on the first side of the insulating housing 10. For example, the heat dissipation structure 21 may be provided with a plurality of heat dissipation fins formed to extend from the anode electrode body, but is not limited thereto.

The anode hood 23 may have a cylindrical shape that surrounds a target and extends towards the second side beyond the target. That is, the anode hood 23 surrounds the target and extends downward beyond the target to prevent scattering of X-rays generated from the target 30.

The anode hood 23 may have a window 23*a* at the lateral surface. The window 23*a* transmits X-rays generated from the target 30. The window 23*a* may be formed of any one selected from the group of beryllium (Be), aluminum (Al), magnesium (Mg), aluminum nitride (AlN), an aluminum-beryllium alloy (AlBe), silicon oxide (SixOy), titanium (Ti), and alloys thereof that have relatively high X-ray transmission. In a preferred embodiment, the window is formed of beryllium material to filter an unnecessary wavelength band from an X-ray.

The target 30 is struck by an electron beam E emitted from the electronic emitter 70, and may provide a target surface inclined with respect to the traveling direction of the electron beam E. The target 30 may be surrounded by the anode hood 23. The target 30 may be formed of tungsten (W), copper (Cu), molybdenum (Mo), cobalt (Co), chromium (Cr), iron (Fe), silver (Ag), tantalum (Ta), or yttrium (Y) that enables X-rays to be emitted when struck by an accelerated electron beam E.

The target 30 enables X-rays to be emitted by being struck by accelerated electrons. When the target 30 is continuously struck by electron beams Es, the focus on the target 30 reaches a high temperature of about 2700° C. or more and the anode electrode 20 as a whole reaches about 1700° C. To prevent focal spot changes due to deformation at such high temperatures, the target 30 may be formed of tungsten (W) having a high melting point of 3440° C., for example.

The gate electrode 40 covers the second side of the insulating housing, and may have an opening 41*a* formed at the side, for example, in the direction of the second side. As will be described later, the cathode electrode 60 is rested on the gate electrode 40, inside the insulating housing via the insulating spacer 50 to communicate with the outside of the insulating housing 10 through the opening 41*a*. A portion of the gate electrode 40 is placed between the anode electrode 20 and the electronic emitter 70, which will be described later, to form the electric field that initiates electron emission.

In an embodiment, the gate electrode 40 may be formed of the same material as the anode electrode 20, but is not limited thereto. For example, a portion of the gate electrode 40 may be formed of the same material as the anode electrode 20, and another portion of the gate electrode 40 may be formed of an iron-nickel-cobalt alloy called Kovar. Specifically, the portion constituting a gate flange 433 may be formed of an iron-nickel-cobalt alloy called Kovar, and another portion, such as a first gate 41 and a gate body 431, of the gate electrode excluding the gate flange 433 may be formed of oxygen-free copper.

The gate electrode 40 may include the first gate 41 and the second gate 43. The first gate 41 covers the second side of the insulating housing 10. The second gate 43 is placed inside the space formed by the insulating housing and the first gate.

The first gate 41 may be formed to cover the lower lateral surface and the bottom of the insulating housing 10. That is, it can be understood that the first gate 41 covers the second side of the insulating housing 10 and is exposed to the outside. The first gate 41 may have the opening 41*a* formed in a downward direction. A gate voltage, that is, a voltage for inducing electron emission by the electronic emitter, may be applied through the first gate 41.

Referring to FIG. 1 showing the conventional field emission X-ray source device in which the gate electrode 94 is placed between the cathode electrode 93 and the anode electrode 92, the insulating housing 91 is separated up and down by the gate electrode 94 and the insulating distance between the anode electrode 92 and the gate electrode 94 is limited to an up-down direction distance between the anode electrode 92 and the gate electrode 94.

Compared to the conventional field emission X-ray source device 9, the gate electrode 40 of the present disclosure is provided with the first gate 41 covering the lower side of the insulating housing 10, so the top of the gate electrode 40 may be moved lower than that of the conventional gate electrode, thereby increasing the insulating distance between an upper end of the gate electrode 40 and the anode electrode 20. In addition, the insulating housing 10 is formed as a single object without being separated up and down by the gate electrode 40, so phenomena, such as ceramic punctures that may occur at the joint portion, causing a decrease in durability can be minimized.

The second gate 43 may be rested on the first gate, inside the insulating housing. The second gate 43 may substantially form the electric field inside the space formed by the insulating housing and the first gate. The second gate 43 may include the gate body 431, a gate mesh 432, and the gate flange 433.

The gate body 431 may be rested on the first gate 41, and may extend upward from the first gate 41. The gate body 431 has a cylindrical shape, and may be provided to hold the insulating spacer 50 in the cylinder and surround the insulating spacer.

The gate mesh 432 may be placed in the second gate 43. An electron beam emitted from the electronic emitter 70 may travel passing through the gate mesh 432. The gate mesh 432 may be a thin metal plate in which multiple holes are formed to enable electron beams to pass through, or may be provided in the form of a metal mesh. The gate mesh 432 may have a circular cross-section such that the gate mesh 432 fits over a mesh opening that is formed on one side of the cathode electrode and has a circular cross-section.

In addition, the gate mesh 432 may be spaced away from the electronic emitter 70 toward the anode electrode 20. That is, the gate mesh 432 and the electronic emitter 70 on top of the cathode electrode 60 may be spaced apart from each other by a particular distance and may face each other. For example, the gate mesh 432 may be spaced away from the electronic emitter 70 by 0.1 mm, but is not limited thereto.

The gate flange 433 may focus an electron beam that travels passing through the gate mesh 432. The gate flange 433 may surround the gate mesh 432 and may extend toward the first side beyond the gate mesh. That is, the gate flange 433 may surround the gate mesh and may extend upward beyond the gate mesh 432.

The gate flange 433 may form a hollow **433*a* in which an electron beam travels passing through the gate mesh 432. The hollow 433*a* may have a particular-shaped cross-section extending in an upward-downward direction. The cross-sectional shapes of the hollow 433*a* may vary depending on a voltage applied to the anode electrode 20 and the cathode electrode 60 and a desired X-ray emission. That is, it can be understood that different shapes of the gate flange 433** may be determined depending on the X-ray emission resulting from focusing of an electron beam.

Figure 5:
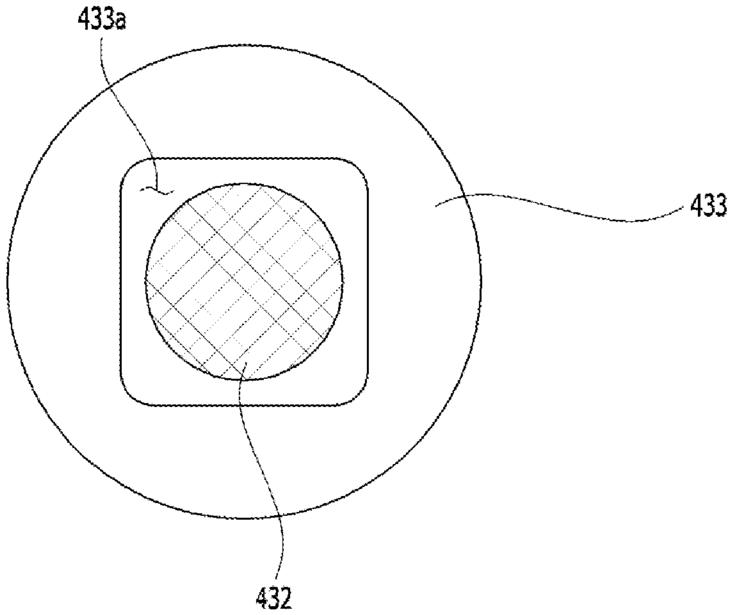
FIG. 5 is a schematic plan view of a lower portion of the field emission X-ray source device 1 according to the embodiment of the present disclosure.

In a preferred embodiment, when the inclined angle of the target (relative to the horizontal line in FIG. 3) is 25 degrees, the hollow formed by the gate flange may have a quadrangular cross-section. Herein, it can be understood that the quadrangular cross-section is a square or rectangular cross-section. In addition, as shown in FIG. 5, preferably, it can be understood that the concept of the quadrangular cross-section includes a shape in which the four corners of the quadrangular cross-section are chamfered (filleted).

The insulating spacer 50 may be placed inside the second gate 43 on the first gate 41. The insulating spacer 50 may be made of an insulating material and have a cylindrical shape. For example, the insulating spacer 50 may be formed of the same material as the insulating housing 10, or a material with similar thermal behavior.

The cathode electrode 60 may be rested on the insulating spacer 50 extending toward the first side from the gate electrode 40, inside the insulating housing 10. In addition, the cathode electrode 60 may be provided such that the cathode electrode 60 communicates with the outside of the insulating housing through the opening **41*a* formed in the first gate. The cathode electrode 60 is placed insulated from the gate electrode 40, inside the insulating housing, and is exposed to the outside through the opening 41*a* of the gate electrode 40, so that insulation breakdown or an arc can be minimized. The cathode electrode 60** may be made of substantially the same material, for example, oxygen-free copper, as the gate electrode and the anode electrode.

The cathode electrode 60 may be placed at the second side of the insulating housing and may face the anode electrode. Electrons are emitted from the electronic emitter 70 placed on the cathode electrode 60 to induce generation of X-rays.

The cathode electrode 60 may include a cathode electrode body 61, an extended part 62, and an expanded part 63. The cathode electrode body 61 is placed on the insulating spacer 50. The extended part 62 extends downward (toward the second side) from the cathode electrode body. The expanded part 63 is expanded to the outside of the insulating spacer beyond the insulating spacer. A ring-shaped resting groove that is depressed in an upward direction for resting on the insulating spacer 50 may be formed between the expanded part 63 and the cathode electrode body 61. In an embodiment, a voltage may be applied to the cathode electrode 60 through an ends of the extended part 62.

The electronic emitter 70 may be placed on the cathode electrode 60, or the electronic emitter 70 may be provided on a separate substrate and coupled to the cathode electrode 60, or may be formed directly on the surface of the cathode electrode 60. The electronic emitter 70 may be formed using multiple nanostructures, for example, carbon nanotubes. The electronic emitter 70 formed using carbon nanotubes may be formed by directly growing multiple carbon nanotubes on the surface of the substrate or the cathode electrode 60 through chemical vapor deposition (CVD), or by applying and firing a carbon nanotube paste.

In a preferred embodiment, the electronic emitter may be carbon nanotubes, which allow electrons to be emitted using a current control method rather than a thermal electron method, thereby facilitating the on/off control of the field emission X-ray source device through the gate voltage applied to the gate electrode 40, and having a compact structure.

In addition, since the electronic emitter 70 is composed of nanostructures, such as carbon nanotubes, the heat generated from the cathode electrode 60 may be minimized. Accordingly, the portion of the anode electrode 20 exposed on a side of the insulating housing has the heat dissipation structure 21 for increasing the surface area of the anode electrode, while the portion of the cathode electrode 60 exposed on a side of the insulating housing does not have a heat dissipation structure for increasing the surface area of the cathode electrode.

Referring back to FIGS. 2 and 3, in the field emission X-ray source device 1 according to the embodiment of the present disclosure, the anode electrode 20 may be exposed on the top side of the insulating housing 10 and the gate electrode 40 may be expose on the bottom side of the insulating housing 10. The cathode electrode 60 is rested on the gate electrode 40, inside the insulating housing 10 via the insulating spacer 50, and communicates with the outside through the opening formed in the gate electrode 40.

In addition, the second gate 43 surrounds the cathode electrode 60 rested on the insulating spacer 50, and the first gate 41 surrounds the second gate. The space between the first gate 41 and the second gate 43 is the inner space of the insulating housing 10 may be understood to be in a substantially vacuum, and the space between the gate body 431 of the second gate 43 and the insulating spacer 50 and cathode electrode 60 therein may be understood to be in a substantially vacuum.

In addition, in the related art, the insulating housing is separated up and down by the gate electrode and the insulating housing is used in multiple states. However, according to the present disclosure, the gate electrode, the cathode electrode, and the insulating spacer are manufactured in modules and combined with the insulating housing 10, which is a single object, so that a cathode module including the gate electrode and the cathode electrode can be easily combined with the insulating housing and ease of manufacture can be achieved.

The above description of the present disclosure is for illustrative purposes only, and those skilled in the art to which the present disclosure pertains will understand that the present disclosure can be embodied in other specific forms without changing the technical ideas or essential characteristics of the present disclosure. Therefore, it should be understood that the embodiments described above are illustrative in all aspects and not restrictive. For example, each element described in a singular form can also be implemented in a distributed manner. Likewise, elements described as distributed can be implemented in a combined form.

The scope of the present disclosure is defined by the appended claims rather than by the detailed description above. It shall be understood that all alterations or modifications derived from the meaning and scope of the claims and their equivalents are included in the scope of the present disclosure.

What is claimed is:

1. A field emission X-ray source device, comprising:
an insulating housing having a tube shape and extending in a longitudinal direction between a first side and a second side;
an anode electrode covering the first side of the insulating housing;
a gate electrode including a first gate covering the second side of the insulating housing and a second gate in a cylindrical shape disposed on the first gate, inside the insulating housing;
a cathode electrode disposed inside the insulating housing;
an electronic emitter provided on the cathode electrode, and configured to emit an electron beam toward the anode electrode;
a target provided on the anode electrode and facing the electronic emitter, and configured to enable X-rays to be generated by collision with the electron beam, and
a cylindrical insulating spacer rested on the first gate, inside the second gate,
wherein the cathode electrode is positioned above the insulating spacer inside the second gate in the longitudinal direction and between the anode electrode and the second gate.

2. The field emission X-ray source device of claim 1, wherein the gate electrode comprises
a gate mesh provided at the second gate.

3. The field emission X-ray source device of claim 2, wherein the electronic emitter and the gate mesh face each other.

4. The field emission X-ray source device of claim 3, further comprising an opening formed in the first gate covering the second side of the insulating housing to expose the cathode electrode to outside.

5. The field emission X-ray source device of claim 2, wherein the second gate comprises a gate flange extending toward the first side of the insulating housing in the longitudinal direction beyond the gate mesh.

6. The field emission X-ray source device of claim 4, wherein the gate electrode, the cathode electrode covering the second side of the insulating housing, and the insulating spacer are manufactured in modules and combined with the insulating housing.

7. The field emission X-ray source device of claim 1, wherein the anode electrode comprises an anode hood surrounding the target and extending toward the second side of the insulating housing toward the cathode electrode.

8. The field emission X-ray source device of claim 7, further comprising a window provided at the anode hood to transmit the X-rays generated from the target.

* * * * *